(12) United States Patent
Demangeot et al.

(10) Patent No.: US 11,193,459 B2
(45) Date of Patent: Dec. 7, 2021

(54) AIR INTAKE SET

(71) Applicant: NOVARES FRANCE, Clamart (FR)

(72) Inventors: Jérôme Demangeot, Calonne sur la Lys (FR); Gregory Facq, Feignies (FR)

(73) Assignee: NOVARES FRANCE, Clamart (FR)

( * ) Notice: Subject to any disclaimer, the term of this patent is extended or adjusted under 35 U.S.C. 154(b) by 0 days.

(21) Appl. No.: 16/754,678

(22) PCT Filed: Sep. 28, 2018

(86) PCT No.: PCT/FR2018/052401
§ 371 (c)(1),
(2) Date: Apr. 8, 2020

(87) PCT Pub. No.: WO2019/073142
PCT Pub. Date: Apr. 18, 2019

(65) Prior Publication Data
US 2020/0355146 A1  Nov. 12, 2020

(30) Foreign Application Priority Data
Oct. 9, 2017  (FR) ................................. 17/59414

(51) Int. Cl.
*F02M 35/10* (2006.01)
*G01F 15/02* (2006.01)

(52) U.S. Cl.
CPC .............. *F02M 35/10091* (2013.01); *F02M 35/10262* (2013.01); *F02M 35/10386* (2013.01); *G01F 15/028* (2013.01)

(58) Field of Classification Search
CPC ....... F02M 35/10091; F02M 35/10262; F02M 35/10386; F02M 33/02; F02M 35/10; F02M 35/1216; F02M 35/10118; G01F 15/028
See application file for complete search history.

(56) References Cited

U.S. PATENT DOCUMENTS

| | | | | |
|---|---|---|---|---|
| 4,131,441 A | * | 12/1978 | Randall | ............ F02M 35/10013 55/385.1 |
| 10,584,719 B2 | * | 3/2020 | Zeng | ..................... F04D 29/462 |
| 2004/0255911 A1 | * | 12/2004 | Abdolhosseini | ........................... F02M 35/10281 123/518 |
| 2018/0202559 A1 | * | 7/2018 | Freeman, III | .......... F02M 19/08 |

FOREIGN PATENT DOCUMENTS

| | | |
|---|---|---|
| EP | 0764819 A1 | 3/1997 |
| EP | 0877161 A1 | 11/1998 |

(Continued)

OTHER PUBLICATIONS

English Machine Translation to Abstract EP0764819.
(Continued)

*Primary Examiner* — Syed O Hasan
(74) *Attorney, Agent, or Firm* — Cantor Colburn LLP

(57) ABSTRACT

An air intake set for a motor vehicle engine, including an air intake hose, a flow meter and a device for directing an air flow positioned upstream of the flow meter with respect to the direction of circulation of the air flow in the hose. The device for directing an air flow is adapted to guide the air flow towards the flow meter and has a variable permeability so as to set the velocity of the air flow.

20 Claims, 5 Drawing Sheets

(56) References Cited

FOREIGN PATENT DOCUMENTS

EP 1418334 A2 5/2004
WO 9810187 A1 3/1998

OTHER PUBLICATIONS

English Translation to International Search Report for Application No. PCT/FR2018/052401.
International Search Report for Application No. PCT/FR2018/052401.
Written Opinion for Application No. PCT/FR2018/052401.

* cited by examiner

AIR INTAKE SET

CROSS REFERENCE TO RELATED APPLICATIONS

This application is a National Stage of PCT Application No. PCT/FR2018/052401 filed on Sep. 28, 2018, which claims priority to French patent application FR17/59414 filed on Oct. 9, 2017, the contents each of which are incorporated herein by reference thereto.

TECHNICAL FIELD

The present invention concerns an air intake set for a motor vehicle engine.

BACKGROUND

Internal combustion engines operate based on the principle of combustion of air and fuel.

In the case of motor vehicles, air originates from an air intake line which captures air outside the vehicle and filters it before it is drawn in the engine.

In a common manner, motor vehicles comprise a flow meter positioned in a hose of the air intake line. The flow meter is a measuring instrument allowing measuring the air flow rate entering into the engine. In particular, this measurement allows monitoring the stoichiometric ratio between air and fuel in the engine. In addition, the flow meter also allows monitoring the recirculation rate of the exhaust gases that are reinjected into the engine. By extension, the measurements of the flow meter are used for homologations of the vehicles in compliance with pollution standards.

Hence, the flow meter is an essential element whose measurements should be as accurate as possible.

Yet, for low flow rates, the air flow is too diffuse for the flow meter to be able to accurately measure the flow rate.

BRIEF SUMMARY

In this context, an object of the present invention is to provide an air intake set for a motor vehicle engine which allows accurately measuring the flow rate of the air flow over the entire range of air flow rates of the operation of the engine.

According to a general definition, the invention concerns an air intake set for a motor vehicle engine, comprising an air intake hose, a flow meter and a device for directing an air flow positioned upstream of the flow meter with respect to the direction of circulation of the air flow in the hose. The device for directing the air flow is adapted to guide the air flow towards the flow meter and has a variable permeability so as to set the velocity of the air flow.

In a particularly advantageous manner, the directing device allows concentrating the air flow towards the flow meter when the air flow flows with a low flow rate. Thus, irrespective of the flow rate, the air flow flows towards the flow meter, so as to enable an accurate measurement of the air flow rate by the flow meter.

Hence, the invention provides an air intake set for a motor vehicle engine which allows accurately measuring the flow rate of the air flow over the entire range of air flow rates of the operation of the engine.

The directing device may have a conical shape with an upstream opening and a downstream opening, so as to focus the air flow on the flow meter.

According to a first embodiment, the directing device has a conical body comprising a plurality of deflectors elastically movable relative to the conical body. The deflectors are adapted to be displaced under the pressure of the air flow, so as to vary the permeability of the directing device.

According to this first embodiment, the conical body may have slots separating each deflector. The slots enable the displacement of each deflector and enable a variation of the permeability of the directing device.

According to a second embodiment, the directing device comprises a conical body having a plurality of openings having different shapes and surfaces.

According to this second embodiment, the conical body may have a first series of openings, positioned in an upstream region and a second series of openings positioned in a downstream region. Each of the openings of the second series may have a surface larger than the surface of each opening of the first series.

According to a third embodiment, the directing device may comprise a conical shaped diaphragm adapted to vary the downstream opening.

The present invention also relates to a method for measuring the flow rate of an air flow circulating in an air intake set according to the invention. The method comprises the steps of:
 (a) circulation of an air flow having a flow rate in the hose;
 (b) variation of the permeability of the directing device according to the flow rate of the air flow (I) circulating in the hose, so as to set the velocity of the air flow and direct the air flow towards the flow meter;
 (c) measurement of the flow rate by the flow meter.

Step (b) may comprise a phase of holding a minimum permeability, or of reducing the permeability, for a flow rate, called low flow rate, comprised between 1 g/s and 10 g/s, so as to concentrate the air flow towards the flow meter and increase the velocity of the air flow.

Step (b) may comprise a phase of increasing the permeability for a flow rate, called high flow rate, comprised between 30 g/s and 250 g/s, so as to reduce the pressure drops.

BRIEF DESCRIPTION OF THE DRAWINGS

Other features and advantages of the present invention will clearly come out from the detailed description hereinafter of three embodiments of the invention, provided as non-limiting examples, with reference to the appended drawings in which.

DETAILED DESCRIPTION

Referring to FIGS. 1 to 9, the invention concerns an air intake set 1 for a motor vehicle engine. The air intake set 1 comprises an air intake hose 2, a flow meter 3 and a device 5 for directing an airflow I positioned upstream of the flow meter 3 with respect to the direction of circulation of the air flow I in the hose 2. For example, the directing device 5 may be made of a plastic material.

Figure 1:
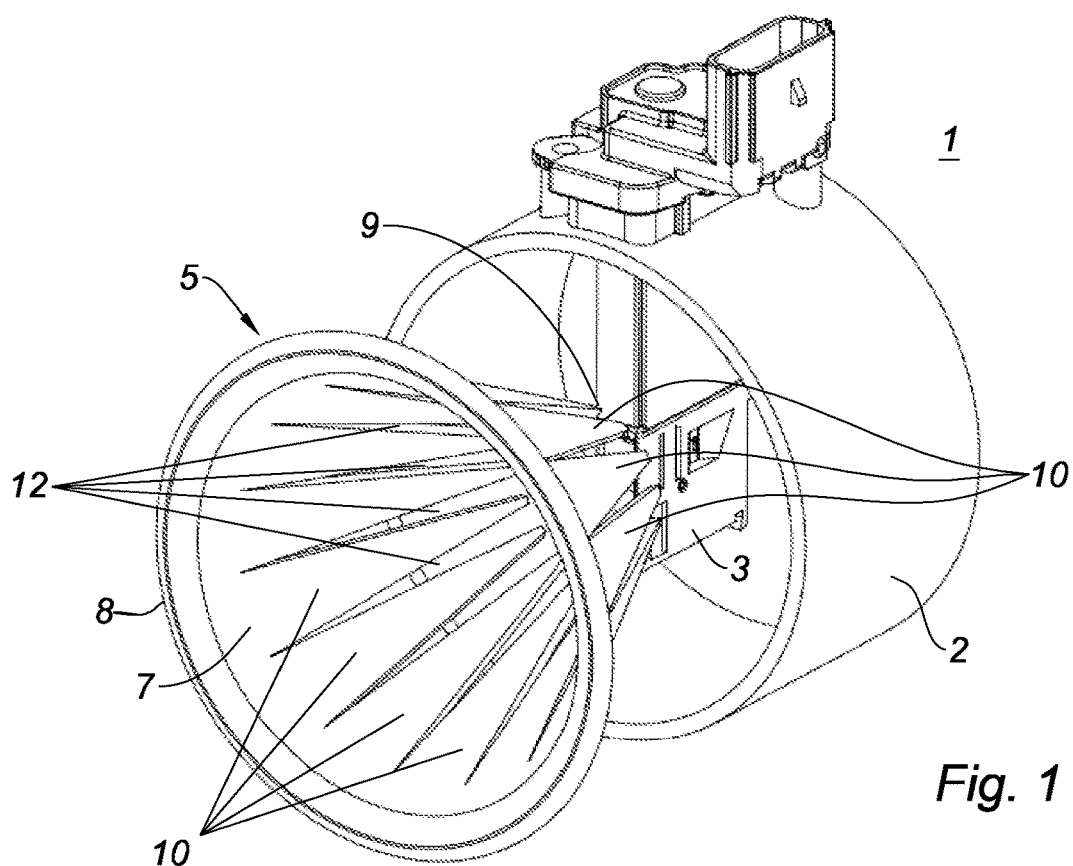
FIG. 1 is a perspective view of an air intake set according to a first embodiment of the invention.
Figure 2:
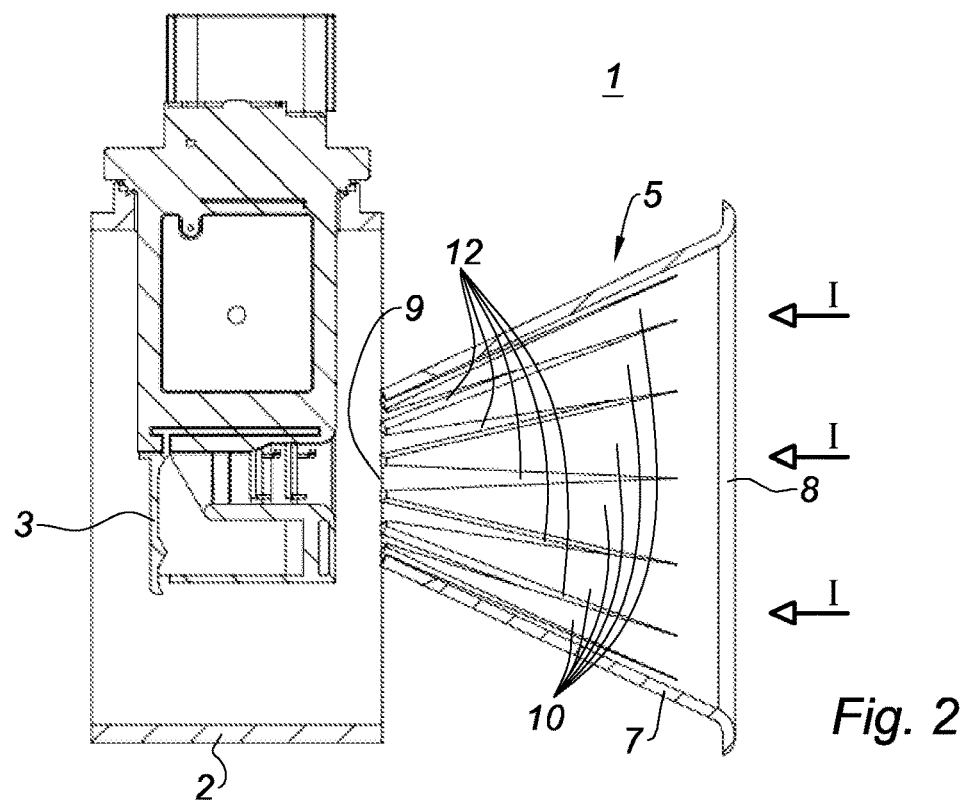
FIG. 2 is a sectional side view of an air intake set according to a first embodiment of the invention.
Figure 3:
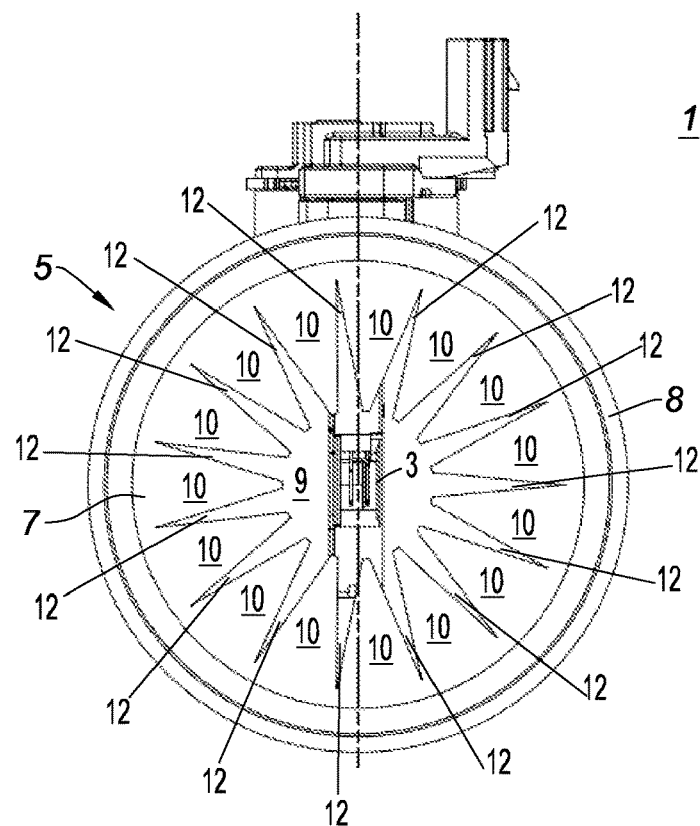
FIG. 3 is a front view of an air intake set according to a first embodiment of the invention.

According to a first embodiment presented in FIGS. 1 to 3, the directing device 5 has a conical body 7 with an upstream opening 8 and a downstream opening 9. In addition, the conical body 7 has a plurality of deflectors 10 elastically movable relative to the conical body 7. According to the example herein presented, the deflectors 10 are separated by slots 12. In addition, according to the example herein presented, the deflectors 10 are integrally molded with the conical body 7.

The deflectors 10 can occupy many positions between a first and a second extreme position. The movement of the deflectors 10 allows varying the downstream opening 9 of the conical body 7. Indeed, the section of the downstream opening 9 evolves between a minimum when the deflectors 10 are in the first extreme position and a maximum when the deflectors 10 are in the second extreme position. The function of the downstream opening 9 will be detailed hereinafter. According to the example herein presented, in the absence of a sufficient flow rate of air, the elasticity of the linkage between the deflectors 10 and the conical body 7 holds the deflectors 10 in the first extreme position.

Figure 4:
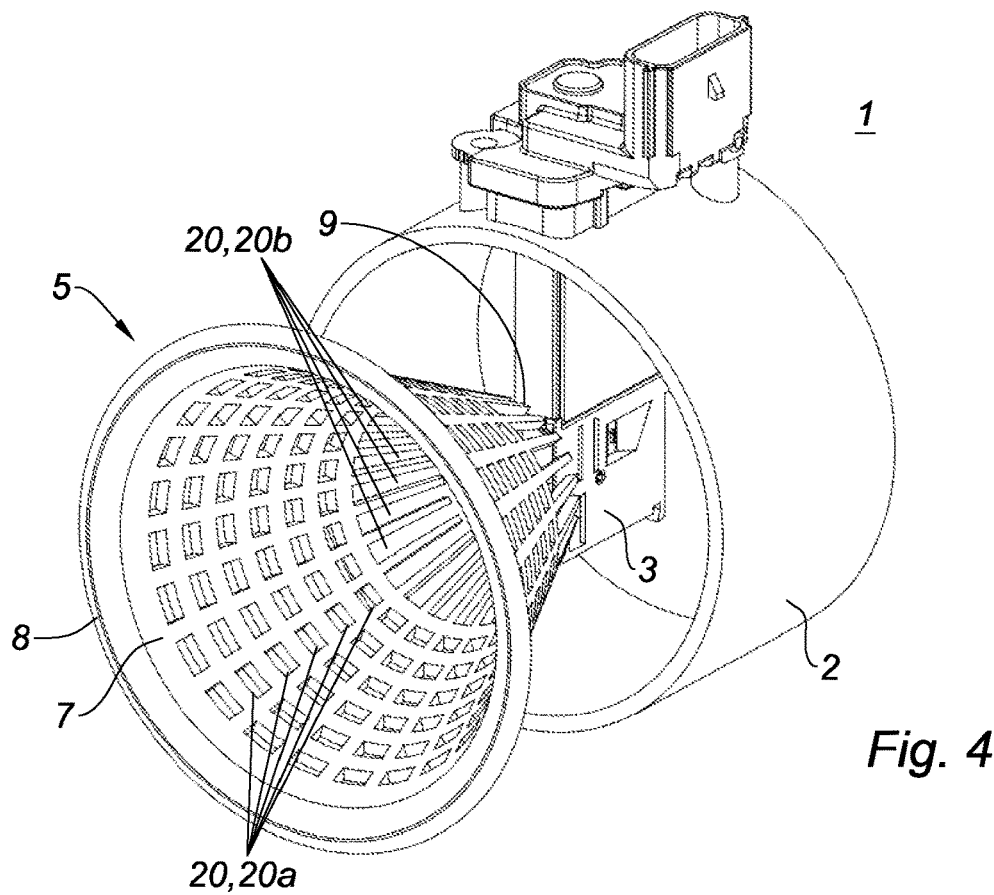
FIG. 4 is a perspective view of an air intake set according to a second embodiment of the invention.
Figure 5:
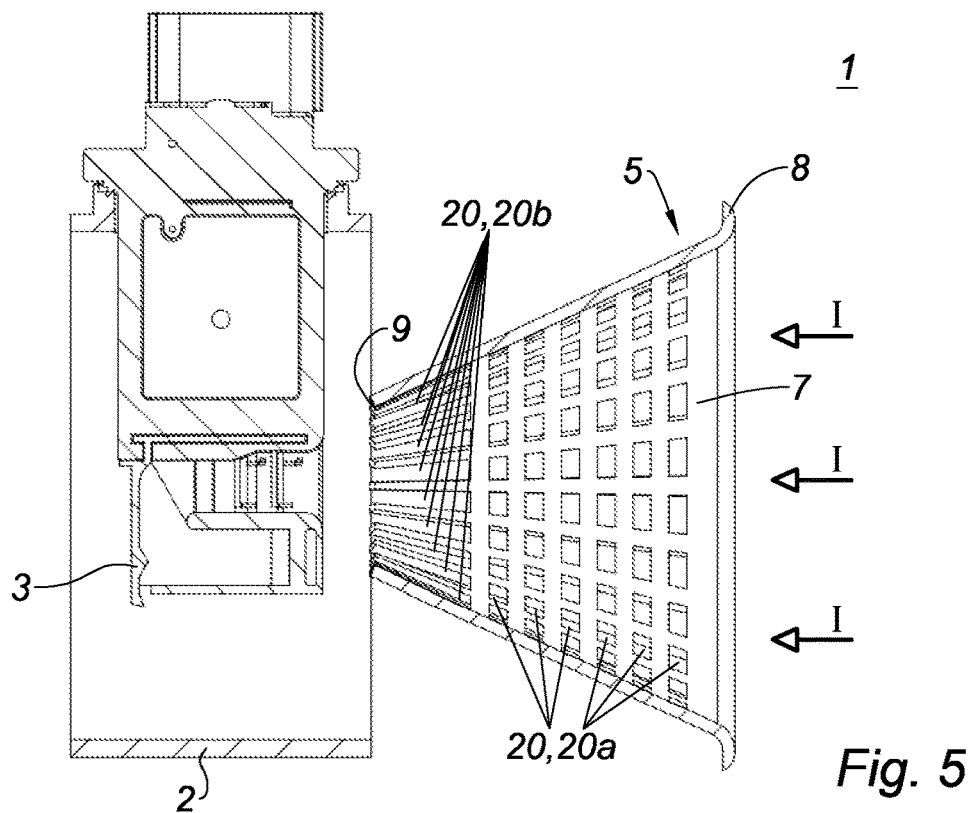
FIG. 5 is a sectional side view of an air intake set according to a second embodiment of the invention.
Figure 6:
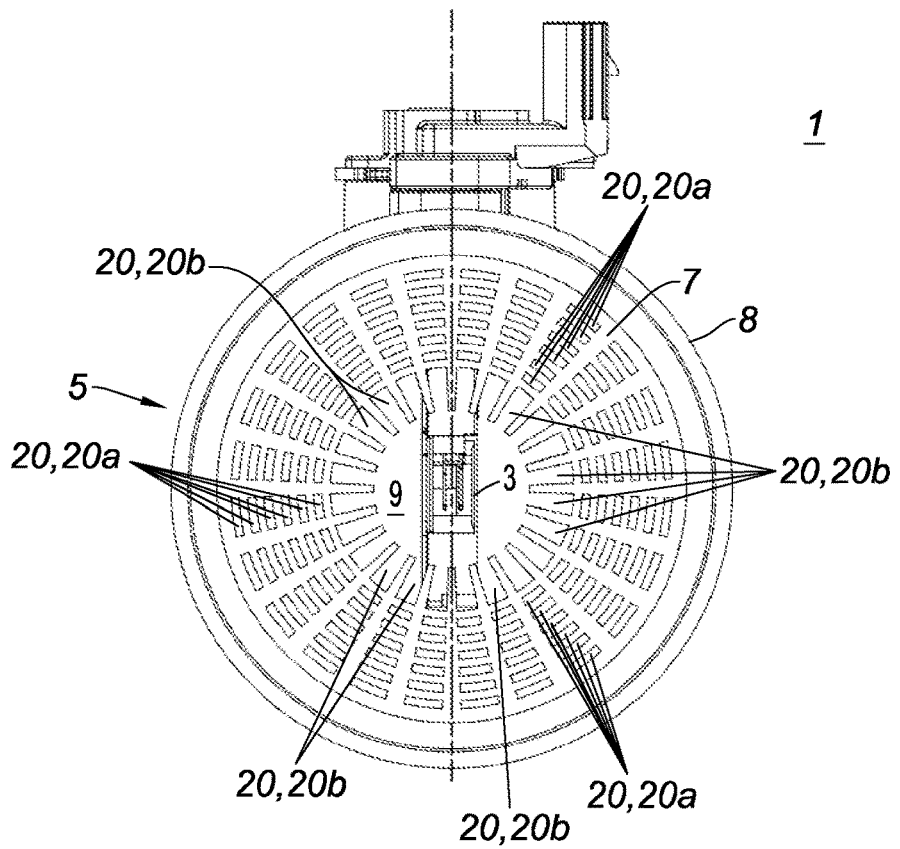
FIG. 6 is a front view of an air intake set according to a second embodiment of the invention.

According to a second embodiment represented in FIGS. 4 to 6, the directing device 5 comprises a conical body 7. The conical body 7 has a plurality of openings 20. The openings 20 have different geometries and surfaces. According to the example herein presented, the conical body 7 has a first series of openings 20a, positioned in an upstream region and a second series of openings 20b positioned in a downstream region in the proximity of the downstream opening 9. Each of the openings 20b of the second series covers a surface larger than the openings 20a of the first series. As will be detailed hereinafter, the difference in surface between the openings 20a of the first series and the openings 20b of the second series, enables the guide device 5 according to the second embodiment to have a variable permeability.

Figure 7:
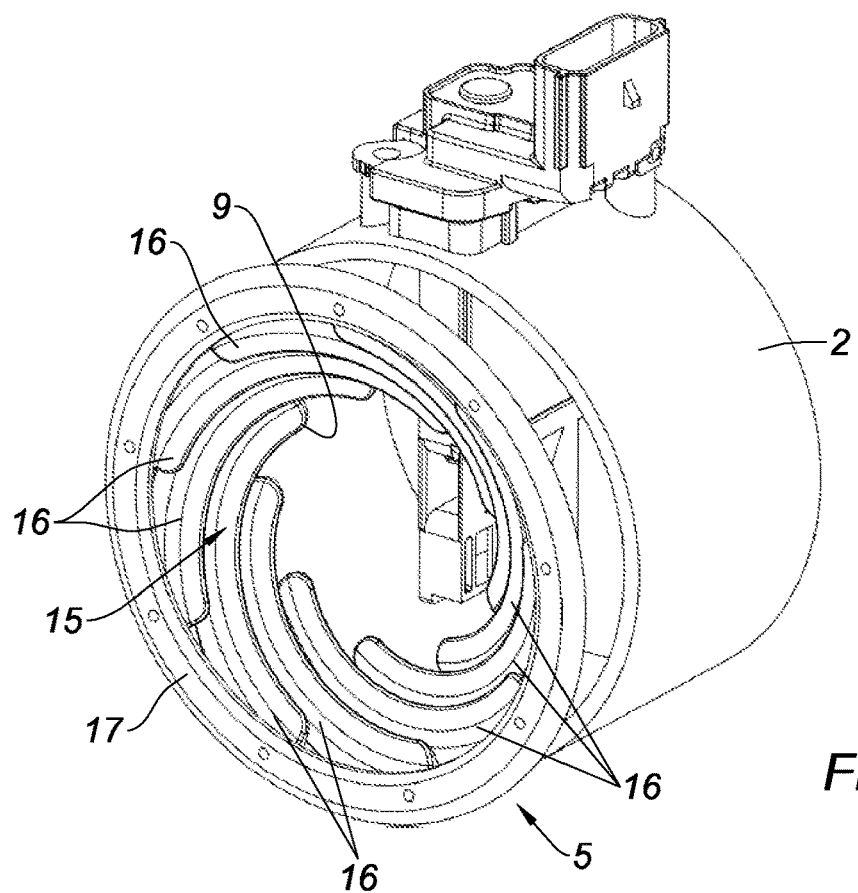
FIG. 7 is a perspective view of an air intake set according to a third embodiment of the invention.
Figure 8:
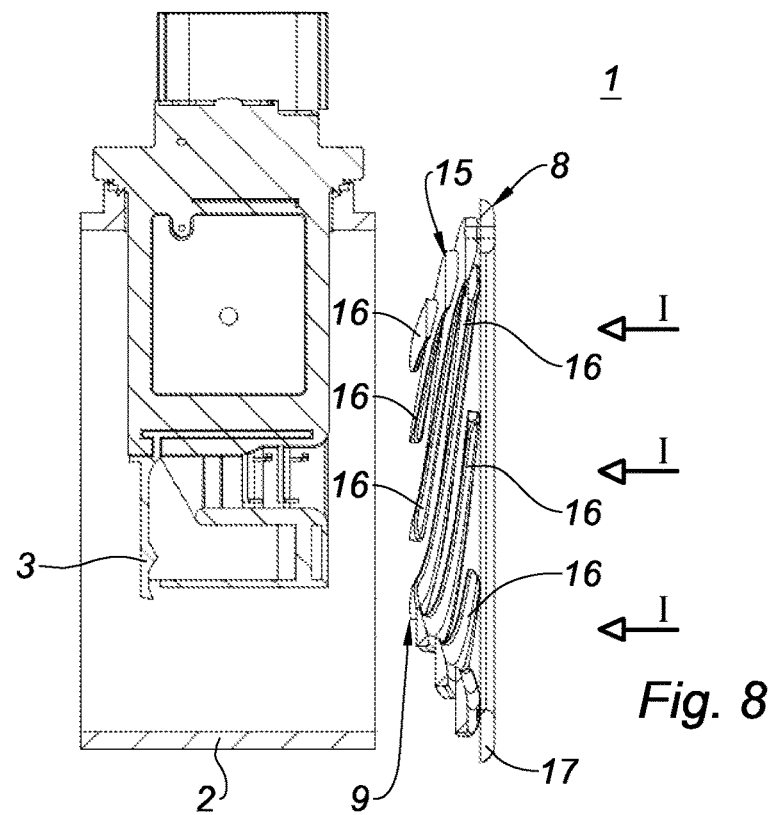
FIG. 8 is a sectional side view of an air intake set according to a third embodiment of the invention.
Figure 9:
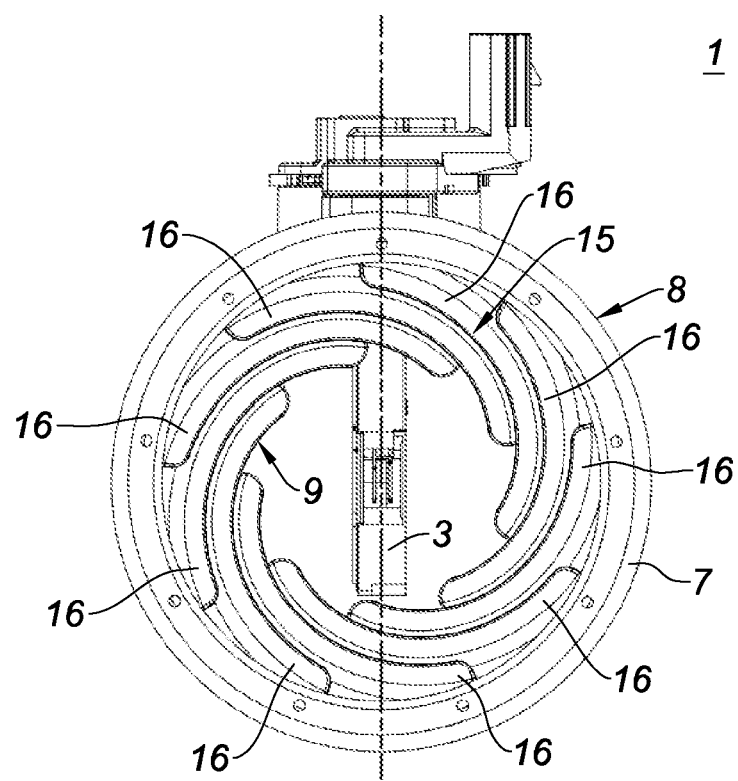
FIG. 9 is a front view of an air intake set according to a third embodiment of the invention.

According to a third embodiment presented in FIGS. 7 to 9, the guide means of the directing device 5 comprise a diaphragm 15. The diaphragm is formed by a series of lamellae 16 retained in a ring 17. The lamellae 16 are elastically biased towards a minimum opening position of the diaphragm 15, and these are spread apart so as to open the diaphragm 15 under the thrust of the air flow I. The diaphragm 15 has a substantially conical geometry. The diaphragm 15 has a downstream opening 9 whose section varies between a maximum when the diaphragm 15 is in the maximum opening position and a minimum when the diaphragm 15 is in the minimum opening position.

Irrespective of the embodiment, at the level of the upstream opening 8, the directing device 5 may have a diameter equivalent to the diameter of the hose 2, so as to be fitted in the hose 2. This technical arrangement allows ensuring that the entire air flow I passes through the directing device 5.

The invention also concerns a method for measuring the flow rate of an air flow (I) circulating in an air intake set 1.

The method essentially comprises the following steps:
(a) circulation of an air flow having a flow rate in the hose;
(b) variation of the permeability of the directing device according to the flow rate of the air flow (I) circulating in the hose, so as to set the velocity of the air flow and direct the air flow towards the flow meter;
(c) measurement of the flow rate by the flow meter.

Step (b) may comprise a phase of holding a minimum permeability, or of reducing the permeability, for a flow rate, called low flow rate, comprised between 1 g/s and 10 g/s, so as to concentrate the air flow towards the flow meter and increase the velocity of the air flow.

Step (b) may comprise a phase of increasing the permeability for a flow rate, called high flow rate, comprised between 30 g/s and 250 g/s, so as to reduce the pressure drops.

When the air flow I has a low flow rate, according to the first embodiment of the invention, the deflectors 10 reduce the downstream opening 9 so as to concentrate the air flow I on the flow meter 3 and increase the velocity thereof. This technical arrangement enables the flow meter 3 to perform an accurate measurement of the flow rate of the air flow 1, when the latter flows with a low flow rate.

According to the second embodiment, when the air flow I has a low flow rate, the airflow I flows mainly through the downstream opening 9 and through the openings 20b of the second series of openings 20. Thus, the air flow I is focused on the flow meter 3 and is not slowed down.

According to the third embodiment, when the air flow I has a low flow rate, the diaphragm 15 reduces the downstream opening 9 so as to concentrate the air flow I on the flow meter 3 and increase the velocity thereof. This technical arrangement enables the flow meter 3 to perform an accurate measurement of the flow rate of the air flow 1, when the latter flows with a low flow rate.

When the air flow I presents a high flow rate, according to the first embodiment of the invention, the pressure of the airflow spreads apart the deflectors 10 which open to the maximum the downstream opening 9, so as to enable a fluid flow of the air flow I thereby reducing the pressure drops.

According to the second embodiment, when the air flow I has a high flow rate, the air flow I passes through all of the openings 20 and the downstream opening 9. Thus, the air flow I has not slowed down, which allows reducing the pressure drops.

According to the third embodiment, when the air flow I has a high flow rate, the pressure of the air flow I on the diaphragm 15 opens to the maximum the downstream opening 9, so as to enable a fluid flow of the air flow I thereby reducing the pressure drops.

Thus, the invention provides an air intake set for a motor vehicle engine which allows accurately measuring the flow rate of the air flow over the entire range of air flow rates of the operation of the engine.

Of course, the invention is not limited to the sole embodiments represented hereinabove, but it encompasses on the contrary all variants thereof.

The invention claimed is:

1. An air intake set for a motor vehicle engine, comprising an air intake hose, a flow meter adapted to measure a flow rate and a directing device positioned upstream of the flow meter for directing an air flow with respect to a direction of circulation of the air flow in the air intake hose, the directing device being adapted to concentrate the air flow towards the flow meter and having a variable permeability so as to set a velocity of the air flow, a variation of a permeability of the directing device depending on a flow rate of the air flow.

2. The air intake set according to claim 1, wherein the directing device has a conical shape with an upstream opening and a downstream opening, so as to focus the air flow on the flow meter.

3. The air intake set according to claim 2, wherein the directing device has a conical body comprising a plurality of deflectors elastically movable relative to the conical body, the plurality of deflectors being adapted to be displaced under a pressure of the air flow, so as to vary the variable permeability of the directing device.

4. The air intake set according to claim 3, wherein the conical body has slots separating each deflector of the plurality of deflectors, the slots enabling displacement of each deflector of the plurality of deflectors and enabling a variation of the variable permeability of the directing device.

5. The air intake set according to claim 2, wherein the directing device comprises a conical body having a plurality of openings having different shapes and surfaces.

6. The air intake set according to claim 5, wherein the conical body has a first series of openings, positioned in an upstream region and a second series of openings positioned in a downstream region, each of the second series of openings having a surface larger than a surface of each the first series of openings.

7. The air intake set according to claim 2, wherein the directing device comprises a conical shaped diaphragm adapted to vary the downstream opening.

8. A method for measuring a flow rate of an air flow circulating in an air intake set for a motor vehicle engine, the air intake set comprising an air intake hose, a flow meter adapted to measure a flow rate and a directing device positioned upstream of the flow meter for directing an air flow with respect to a direction of circulation of the air flow in the air intake hose, the directing device being adapted to guide the air flow towards the flow meter and having a variable permeability so as to set a velocity of the air flow, wherein the method comprises:
circulation of an air flow having a flow rate in the air intake hose;
variation of a permeability of the directing device according to the flow rate of the air flow circulating in the air intake hose, so as to set a velocity of the air flow and direct the air flow towards the flow meter;
measurement of the flow rate by the flow meter.

9. The method according to claim 8, wherein the variation step comprises a phase of holding a minimum permeability of the directing device, or a phrase of reducing the permeability of the directing device, for a flow rate, called low flow rate, comprised between 1 g/s and 10 g/s, so as to concentrate the air flow towards the flow meter and increase the velocity of the air flow.

10. The method according to claim 9, wherein the variation step comprises a phase of increasing the permeability of the directing device for a flow rate, called high flow rate, comprised between 30 g/s and 250 g/s, so as to reduce pressure drops.

11. The method as in claim 8, wherein the directing device has a conical shape with an upstream opening and a downstream opening, so as to focus the air flow on the flow meter.

12. The method as in claim 11, wherein the directing device has a conical body comprising a plurality of deflectors elastically movable relative to the conical body, the plurality of deflectors being adapted to be displaced under a pressure of the air flow, so as to vary the variable permeability of the directing device.

13. The method as in claim 12, wherein the conical body has slots separating each deflector of the plurality of deflectors, the slots enabling the displacement of each deflector of the plurality of deflectors and enabling a variation of the variable permeability of the directing device.

14. The method as in claim 11, wherein the directing device comprises a conical body having a plurality of openings having different shapes and surfaces.

15. The method as in claim 14, wherein the conical body has a first series of openings, positioned in an upstream region and a second series of openings positioned in a downstream region, each of the second series of openings having a surface larger than the surface of each opening of the first series of openings.

16. The method as in claim 11, wherein the directing device comprises a conical shaped diaphragm adapted to vary the downstream opening.

17. The method according to claim 14, wherein the variation step comprises a phase of holding a minimum permeability of the directing device, or a phase of reducing the permeability of the directing device, for a flow rate, called low flow rate, comprised between 1 g/s and 10 g/s, so as to concentrate the air flow towards the flow meter and increase the velocity of the air flow.

18. The method according to claim 17, wherein the variation step comprises a phase of increasing the permeability of the directing device for a flow rate, called high flow rate, comprised between 30 g/s and 250 g/s, so as to reduce pressure drops.

19. The method according to claim 15, wherein the variation step comprises a phase of holding a minimum permeability of the directing device, or a phase of reducing the permeability of the directing device, for a flow rate, called low flow rate, comprised between 1 g/s and 10 g/s, so as to concentrate the air flow towards the flow meter and increase the velocity of the air flow.

20. The method according to claim 19, wherein the variation step comprises a phase of increasing the permeability of the directing device for a flow rate, called high flow rate, comprised between 30 g/s and 250 g/s, so as to reduce pressure drops.

* * * * *